(12) United States Patent

Martin et al.

(10) Patent No.: US 7,755,794 B2
(45) Date of Patent: Jul. 13, 2010

(54) TRAY ACCESS LOCK

(75) Inventors: Cynthia L. Martin, Eagle, ID (US); Anita G. Tjan, Boise, ID (US); Barbara Jo Gaston, Garden City, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1695 days.

(21) Appl. No.: 10/692,375

(22) Filed: Oct. 22, 2003

(65) Prior Publication Data
US 2005/0088679 A1    Apr. 28, 2005

(51) Int. Cl.
*H04N 1/00* (2006.01)
*H04N 1/04* (2006.01)
(52) U.S. Cl. ........................ 358/1.6; 358/498
(58) Field of Classification Search ............. 358/1.1, 358/1.6, 1.8, 1.9, 1.13, 498; 271/3.03, 3.14; 399/405, 407
See application file for complete search history.

(56) References Cited

U.S. PATENT DOCUMENTS

| 4,332,464 A | 6/1982 | Bartulis et al. |
| 5,157,448 A | 10/1992 | Lang |
| 5,534,974 A * | 7/1996 | Hasegawa ............... 399/1 |
| 5,873,276 A | 2/1999 | Dawson et al. |
| 6,470,155 B1 | 10/2002 | Martin et al. |
| 6,850,337 B1 * | 2/2005 | Anderson et al. ......... 358/1.15 |
| 2001/0022665 A1 | 9/2001 | Yajima et al. |

* cited by examiner

*Primary Examiner*—Gabriel I Garcia

(57) ABSTRACT

A method of limiting access to a media tray, wherein the method includes defining a target pass code associated with a media tray. The method includes restricting access to the media tray to print jobs associated with job pass codes having a predefined relationship with the target pass code.

29 Claims, 2 Drawing Sheets

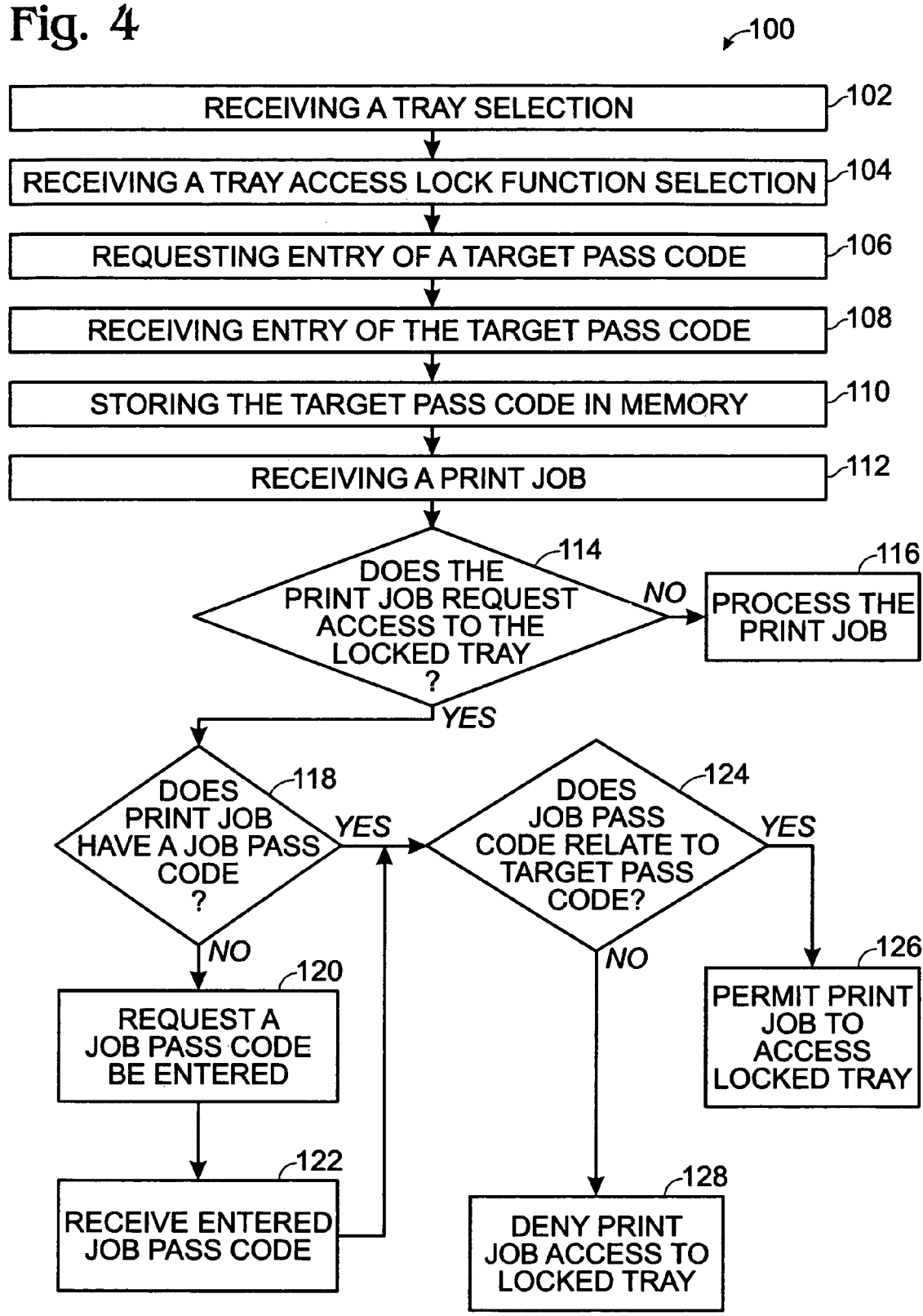

TRAY ACCESS LOCK

BACKGROUND

Office devices have increased the efficiency of the modern office and increased the productivity of office staffs, through an increase in the functions that these devices can perform. Technical advances in office devices have enabled the devices to handle a variety of media types for processing different types of print jobs.

Typically, a person using a networked office device to process a print job loads special media, and hopes someone else with access to the networked office device does not accidentally print on the special media. Expensive special media may be wasted by accidentally printing a print job on special media, when the print job does not require special media. Accordingly, a user attempting to print on special media may attempt to hover over an office device and make sure that the wrong print job is not printed on the special media. Manually intercepting print jobs at the office device may not be very effective, especially where it is difficult to determine whether the print job is the wrong print job until it is too late. Additionally, if the person does not have a network workstation close to the office device the logistics of this manual intercept method may prove difficult.

In some office devices, a user may lock-out access to the office device control panel. This lock-out can be useful to prevent other users from changing the settings of the office device. However, if the device remains online and accepting print jobs, this may not prevent accidental waste of special media, as described above. On the other hand, uniformly preventing other users from printing jobs may cause significant down time, and thus may significantly limit the office device resources available to other users of the office device.

BRIEF DESCRIPTION OF THE DRAWINGS

FIG. 4 is a flow chart illustrating a tray lock system, according to an embodiment of the invention.

DETAILED DESCRIPTION

Figure 1:
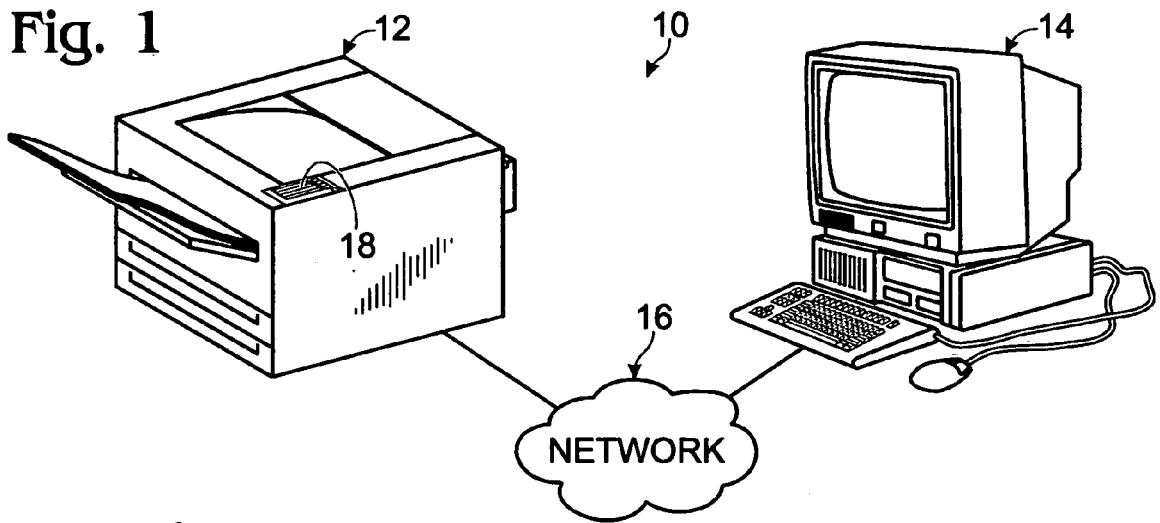
FIG. 1 is a schematic representation of a network system employing a tray lock system, according to an embodiment of the invention.

Referring initially to FIG. 1, a network environment suitable for use in implementing a network device having a tray lock system is shown, the network environment being generally indicated at 10. As indicated, network environment 10 may include a network device 12 and a network terminal 14. Network device 12 and network terminal 14 may be connected for electronic data communication over a communication network 16.

Network terminal 14 may be any suitable network terminal, including a desktop computer, a laptop computer, a handheld computer, a palm computer, a thin client, a server computer, etc. Network terminal 14 typically sends print jobs to network device 12 over communications network 16.

Communication network 16 may be a local area network, a wide area network, a wireless network, or any other suitable network configured to transmit electronic data, using any data transmission protocol. Communication network 16 may include any network topography.

Network device 12 may be any type of office device or computer peripheral capable of processing print jobs. For example, network device 12 may be, a printer, a facsimile, a copier, a multifunction device, and/or the like. Network device 12 includes a user interface in the form of control panel 18, which is configured to permit a user to select functions and interact with the network device. Network device 12 further includes at least one media tray configured to store media for printing thereon.

Network device 12 and network client 14 may be used to generate print jobs, and as such may be referred to as print job originators. Print job originators may be any type of device capable of creating a print job including a fax machine, a copier, a scanner, computing hardware and software, client computers, client terminals, hand held computers, portable computers, laptop computers, desktop computers, communications devices, cell phones, etc.

Figure 2:
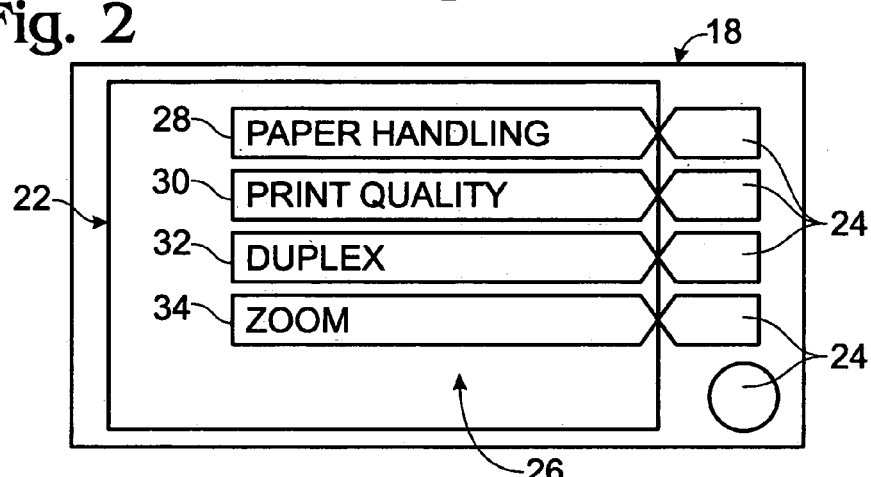
FIG. 2 is a schematic representation of a user interface including a menu for use in a tray lock system, according to an embodiment of the invention.

FIG. 2 shows control panel 18 in greater detail. Control panel 18 includes a display 22 configured to communicate with a user. Typically, display 22 is a liquid crystal display or other similar type of flat panel display capable of presenting text and images to a user. Control panel 18 also includes user-selectable buttons 24 that may be associated with a menu 26 of device functions. It will be understood that display 22 may be touch sensitive. Alternatively, actual physical buttons 24, as shown in FIG. 2, may be placed beside display 22.

Control panel 18 may be used to access a tray access lock, or lock function that limits access of copy or print jobs to selected media trays of network device 12. Locking access to selected media trays may prevent accidental use of special media. For example, if special paper awards certificates were loaded into a media tray of network device 12, the lock function can be used to prevent letters, or memorandum, or other types of documents from being printed on the award certificates. The lock function will be discussed in more detail below with reference to a specific non-limiting example.

Figure 3:
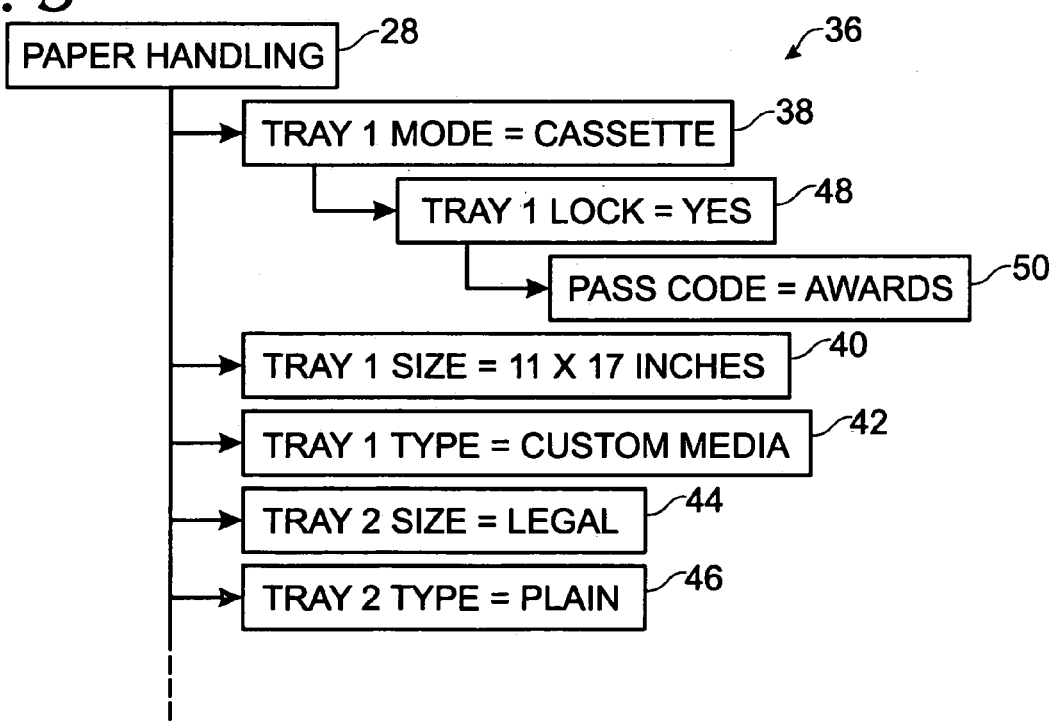
FIG. 3 is a schematic representation of a menu map showing a tray lock system, according to an embodiment of the invention.

Menu 26, as shown in FIG. 2, may include a paper handling function 28, a print quality function 30, a duplex function 32 and a zoom function 34. It will be understood that other functions also may be included in menu 26, or additional menus of further functions may be accessible through a menu tree structure by selecting one of the functions that appears initially in menu 26. One example of a menu tree structure associated with paper handling function 28 is shown in FIG. 3. This exemplary menu tree structure illustrates how a user may access the functions of a network device to implement a tray access lock.

FIG. 3 corresponds to the following example of a user implementing the tray access lock. For example, a user may need to print award certificates for an upcoming recognition ceremony at a professional organization's annual banquet. The user purchases the media for the awards certificates at a cost of $1.00/sheet. The user decides to print the awards from a network terminal to a network device that is concurrently used by 10-15 other users. Not wanting other users to print to the user's special media, the user locks out the other users with the tray access lock system using several steps. First, a user goes to the printer and selects a paper tray labeled "Tray 1". "Tray 1" becomes the selected media tray. Then the user puts the media for the award certificates in the selected media tray, or "Tray 1." Next a user makes a selection of the "paper handling" function from the control panel on the printer. Selection of the "paper handling" function permits the user to access the functions required to configure the device to lock access to the selected media tray. Following the "paper handling" selection, the user makes a selection on the control panel for the tray that corresponds to the selected media tray, in this example "Tray 1," which the user loaded with media for the award certificates. After selecting "Tray 1," the user selects the lock function for the selected media tray. The lock function enables the user to program in a target pass code. The user then enters a target pass code to limit the access to the now locked selected media tray. Now, the selected media tray is locked and only print jobs with a job pass code that corresponds with the target pass code will be allowed to print to the media in the selected media tray. A job pass code may correspond with the target pass code in any number of ways. For example, the job pass code and the target pass code may match. Alternatively, the job pass code and target pass code may be complementary or may relate in some other predefined way. The completion of the previous steps configures the network device so that it locks access to the selected media tray.

Finishing the tray access lock system configuration of the printer, the user returns to a network terminal to send a print job to the printer requesting the locked "Tray 1." The print driver may prompt the user to enter a job pass code to access the locked "Tray 1." The user may then enter the job pass code and the network device compares the job pass code to the target pass code and the print job prints to locked "Tray 1" if the job pass code corresponds with the target pass code.

A user may give the target pass code to other network users to access the locked tray if they are printing the same special print jobs. For example, if two users were splitting up the task of filling out the award certificates, both could be given the target pass code. Accordingly, only the two users with the target pass code would have access to the locked tray, by entering job pass codes that corresponds with the target pass code. Correspondingly, only the two users with the target pass code would be able to print on the award certificates.

Menu tree structure 36, shown in FIG. 3, illustrates how several functions and settings may be accessed to set or change the configuration of network device 12. Menu tree structure 36 is schematic and illustrates only one of a plurality of selections and settings that may be selected or input by user interaction with control panel 18. It will be understood that other menu tree structures illustrating other functions may exist for network device 12.

Menu tree structure 36 shows a set of menu selections that appear on display 22 after selection of paper handling function 28. As shown, a series of settings and functions associated with paper handling in network device 12 are displayed including: a "Tray 1 Mode" function 38, a "Tray 1 Size" function 40, a "Tray 1 Type" function 42, a "Tray 2 Size" function 44, and a "Tray 2 Type" function 46. Each of these functions is discussed below in more detail.

"Tray 1 Mode" function 38 may be used to adjust the mode settings of the media tray of network device 12 labeled "Tray 1." As shown in menu tree structure 36 "Tray 1 Mode" is set to cassette mode. Each of functions 38 thru 46 may include sub-functions that are accessible by selection of that function on control panel 18. More details about "Tray 1 Mode" function 38 will be discussed below.

"Tray 1 Size" function 40 may permit a user to set the size of the media loaded into "Tray 1" of network device 12. For example, as shown in FIG. 3, the media size is set to 11×17 inches. A user may set the media size of "Tray 1" based on the content of "Tray 1" for the specific network device being used. For some printers, the tray labeled "Tray 1" is configured to handle different sizes of media and thus may vary. Additionally, in some network devices different trays may be manually configured to accept different media types and sizes.

"Tray 1 Type" function 42 permits a user to label the type of media loaded in "Tray 1." For example, as shown in FIG. 3, the media type indicated for "Tray 1" is "Custom Media" (which describes the award certificates that are loaded into "Tray 1" for the printing of awards). It will be understood that a series of preset media types may be toggled through to select the correct type. "Custom Media" may represent any of a variety of different media types, including awards certificates, or other specialty formats.

"Tray 2 Size" function 44 permits a user to set the size of the media loaded into "Tray 2" of network device 12. For example, as shown in FIG. 3, the media size is set to "Legal" size. A user may set the media size of "Tray 2" based on the contents of "Tray 2," as described above with reference to "Tray 1."

"Tray 2 Type" function 46 permits a user to label the type of media loaded in "Tray 2." For example, FIG. 3 shows the media type labeled "Plain" to indicate that "Tray 2" contains plain paper media. It will be understood that a series of different media types may be toggled through or selected by a user. The media types available for selection may depend upon the type of network device 12 and its capabilities.

A "Tray 1 Lock" sub-function 48 is shown in FIG. 3, and is dependent from "Tray 1 Mode" function 38. By dependent it should be understood that access to "Tray 1 Lock" Sub-function 48 may first require selection of "Tray 1 Mode" function 38. It will be understood that alternate menu structures may be used to invoke a function or sub-function.

"Tray 1 Lock" sub-function 48 may be set to either "Yes," as shown in FIG. 3, or "No" (not shown). If "Tray 1 Lock" sub-function 48 is set to "Yes," then the user may be prompted to enter a target pass code. A "Pass Code" sub-function 50 allows the user to input a target pass code. The target pass code may be entered using control panel 18. The target pass code enables a copy or print job to access the locked tray. For example, a job pass code may be transmitted with a print job from network terminal 14, or a job pass code may be entered into the control panel on network device 12 when a copy job is attempted. In either case, the job pass code permits access to the locked tray when the job pass code corresponds with the target pass code.

FIG. 4 is a flow chart illustrating a method 100 of locking access to a media tray. Method 100 includes receiving a tray selection on the network device, as indicated at 102. Receiving a tray selection typically occurs when a user is loading special media. The user typically selects the tray that the special media is loaded into. The selection may occur via a user interface on a control panel of the network device, or simply the act of loading special media into a media tray may be a selection of a media tray.

The user interface on the control panel of the network device may be referred to as a user interface associated with the media tray. A user interface associated with the media tray may also be a prompt on the screen of a network client or terminal. It will be understood that a user interface associated with the media tray will be any user interface on any device that is part of the network system implementing a tray access lock that may be configured to control access to the media tray.

The network device receives a tray access lock function selection at 104. Selection of the tray access lock function typically causes the selected tray to be locked from access without proper authorization. Authorization may be achieved through the setting of a target pass code.

The target pass code may be set in a number of ways. For example, one way includes the network device requesting entry of a target pass code in order to set the target pass code, as indicated at 106. Entry of the target pass code may occur at the control panel of the network device, as discussed above.

In another example, the network device may include a sensor that identifies the media and sets the pass code automatically as an alphanumeric string identifying the media that the sensor detected. For example, if overhead transparencies are loaded as a special media and the target pass code may automatically be set to "transparencies."

Still another example of setting a target pass code includes receiving user inputs for a target pass code from a network terminal, or network client, in response to screen prompts requesting entry of a target pass code generated either locally by a print driver or remotely by a network device associating the user interface of the network terminal with the media tray that the target pass code is intended to protect.

The network device receives entry of the target pass code, as indicated at 108, in any of the way described above. In order to set the target pass code the entered target pass code is stored in memory, as indicated at 110. It will be understood that the memory that stores the target pass code may be memory in the network system located at any component of the network system. Typically the memory will be located at the network device having the media tray to be locked, also know as the selected media tray. The target pass code is used to restrict access to the selected media tray by permitting only print jobs that have a corresponding job pass code to print to media in the selected media tray. That is to say that access to selected media tray is restricted to print jobs accompanied by a job pass code that corresponds with the target pass code. As indicated above, corresponding pass codes may be is determined by comparing the character string of the target pass code with the character string of the job pass code, and determining that a match exists (e.g., when the position and identity of each character in the job pass code is identical to the position and identity of each character in the target pass code). It will be understood, however, that other relationships between the job pass code and the target pass code similarly may indicate corresponding pass codes.

The network device receives a job from a network client, as indicated at 112. Typically, the job is a print job sent from a network client attempting to print a document on the network device. However, a print job may also be in the form of a copy job initiated at the network device. The network device determines whether the job is requesting access to the locked media tray, as indicated at 114 in FIG. 4. If the job is not requesting the locked media tray, the network device processes the print job, as indicated at 116. If the print job is requesting the locked media tray, the network device checks to determine if the print job has a job pass code, as indicated at 118.

If the print job does not have a job pass code, the network device may use an associator configured to associate a job pass code with the print job. The associator requests that a job pass code be entered via a user interface associated with the media tray, as indicated at 120. If the job has a job pass code, the job pass code is compared to the target pass code, as indicated at 124. The associator request may be in the form of a prompt at the network client, or may be entered at the control panel of the network device. The network device receives the entered job pass code through either a network client or from the control panel, as indicated at 122.

After the network device has received a job pass code, whether the job pass code corresponds with the target pass code is determined, as indicated at 124. In one embodiment, the job pass code is compared to the target pass code to determine whether they are made up of the same string of alphanumeric characters. If the job pass code and the target pass code are not the same string of alphanumeric characters, then the print job is denied access to the locked media tray, as indicated at 128. If the job pass code and the target pass code are the same string of alphanumeric characters, then the network device permits the print job to access the locked media tray, as indicated at 126. More generally, it will be appreciated that access to a locked media tray may be restricted to print jobs having a predefined relationship with the target pass code.

A method for limiting access to a media tray may include defining a target pass code associated with a media tray. If more than one media trays are present, the first step in defining a target pass code is selection of the media tray. Typically, a media tray is selected, either through a menu on the printing device control panel or through print driver software generating a print job. Selecting a media tray and associating a pass code therewith may define the target pass code. The target pass code typically includes a string of alphanumeric characters.

It may be possible that a sensor in a media tray detects the type of media and when the media is a special media from a predefined list of special media a target pass code is automatically generated for the media. A controller may be configured to limit access to the media by only permitting print jobs with associated job pass codes which correspond with the target pass code to print on the media.

Another application of the tray access lock system may include a broadcast target pass code function. The broadcast target pass code function may be used to permit broader, but semi-restricted access to a locked media tray of a device. This system may prevent accidental printing on special media that is frequently used, including for example, company letterhead.

Accordingly, if a user loads a special media, such as letterhead, into a media tray of a network device, the tray access lock system may be used to set a target pass code to be broadcast to originators of print jobs. Typically, the target pass code also may be set to identify the special media in the media tray when broadcasting the target pass code. The target pass code thus may be broadcast to network clients and/or other components identified as potential sources of print jobs at the network device.

One example where the target pass code broadcast function may be helpful is when letterhead is loaded into a media tray of a network device for use by multiple network users. In this case the target pass code is set to "letterhead" and the broadcast function is enabled. When a print job requesting access to the media tray with letterhead is received, the network device sends a message to the originator of the print job displaying the target pass code and requesting confirmation that the print job should be printed on the letterhead media. If an affirmative response is received, a job pass code is set to correspond to the target pass code so that access to the media tray will be permitted. Alternatively, the originator of the print job (via a user) may cancel the print job, or may change the requested media tray. The tray access lock system thus may enable prevention of errant printing on letterhead.

While the present disclosure has been made with reference to the foregoing preferred embodiments, those skilled in the art will understand that many variations may be made therein without departing from the spirit and scope defined in the following claims. The disclosure should be understood to include all novel and non-obvious combinations of elements described herein, and claims may be presented in this or a later application to any novel and non-obvious combination of these elements.

What is claimed is:

1. A method of limiting access to a media tray comprising:
defining a target pass code associated with a media tray of a network device by selecting the media tray and receiving the target pass code from a user via a user interface associated with the network device; and
restricting access to the media tray to print jobs having a job pass code corresponding with the target pass code.

2. The method of claim 1, wherein selecting the media tray includes loading the media tray.

3. The method of claim 1, wherein defining the target pass code further includes, upon selecting the media tray, requesting a target pass code be entered via the user interface.

4. The method of claim 1, further comprising receiving a print job accompanied by the job pass code.

5. The method of claim 4, further comprising, where the print job is not accompanied by the job pass code, prompting entry of the job pass code.

6. The method of claim 5, wherein prompting entry of the job pass code includes prompting display of a message requesting entry of the job pass code on a print job originator.

7. The method of claim 6, further comprising receiving the job pass code from the print job originator.

8. The method of claim 6, further comprising receiving the job pass code via a control panel associated with the print job originator.

9. The method of claim 1, wherein restricting access to the media tray includes:
comparing the job pass code to the target pass code; and
permitting the print job access to the selected media tray when the job pass code corresponds with the target pass code.

10. The method of claim 1, further comprising:
receiving a selection of the media tray from a print job originator;
sending a message to the print job originator and requesting confirmation of a characteristic of the print job corresponding to the selected media tray; and
upon receiving confirmation from the print job originator, setting the job pass code to have a predefined relationship with the target pass code.

11. The method of claim 10, wherein requesting confirmation of a characteristic of the print job includes broadcasting the characteristic to the print job originator.

12. The method of claim 1, wherein the job pass code includes an alphanumeric string.

13. The method of claim 1, wherein the target pass code includes an alphanumeric character string.

14. The method of claim 1, wherein defining the target pass code includes providing a screen prompt on the user interface associated with the media tray.

15. The method of claim 1, wherein the user interface comprises a control panel provided on the network device.

16. The method of claim 1, wherein the user interface is provided on a network terminal in communication with the network device.

17. A storage device readable by a processor, tangibly embodying instructions executable by the processor to:
define a target pass code associated with a media tray of a network device by receiving a selection of the media tray and entry of the target pass code from a user via a user interface associated with the network device; and
restrict access to the media tray to print jobs accompanied by a job pass code having a predefined relationship with the target pass code.

18. The storage device of claim 17, wherein the storage device further embodies instructions executable to receive the print job accompanied by the job pass code.

19. The storage device of claim 18, wherein the storage device further embodies instructions executable to prompt entry of the job pass code, where the print job is not accompanied by the job pass code.

20. The storage device of claim 19, wherein instructions executable to prompt entry of the job pass code include instructions to prompt display of a message requesting entry of the job pass code on a print job originator.

21. The storage device of claim 20, wherein the storage device further embodies instructions executable to receive the job pass code from the print job originator.

22. The storage device of claim 20, wherein the storage device further embodies instructions executable to receive the job pass code via a control panel associated with the print job originator.

23. The storage device of claim 17, wherein the instructions executable to restrict access to the media tray includes instructions to:
compare the job pass code to the target pass code; and
permit the print job access to the selected media tray when the job pass code has a predefined relationship with the target pass code.

24. The storage device of claim 17, further comprising instructions to:
receive a selection of the media tray from a print job originator;
send a message to the print job originator and request confirmation of a characteristic of the print job corresponding to the selected media tray; and
upon receipt of confirmation from the print job originator, set the job pass code to have the predefined relationship with the target pass code.

25. The storage device of claim 24, wherein instructions to request confirmation of a characteristic of the print job include instructions to broadcast the characteristic to the print job originator.

26. A method of limiting access to a media tray comprising:
defining a target pass code associated with a media tray of a network device by sensing a characteristic of media in the media tray and automatically setting the target pass code based on the sensed characteristic; and
restricting access to the media tray to print jobs having a job pass code that corresponds with the target pass code.

27. The method of claim 26, wherein restricting access to the media tray includes restricting access to print jobs having a job pass code that matches the target pass code.

28. The method of claim 26, wherein restricting access to the media tray includes restricting access to print jobs having a job pass code that is complementary to the target pass code.

29. The method of claim 26, wherein automatically setting the target pass code based on the sensed characteristic includes identifying the media with the target pass code.

* * * * *